United States Patent [19]

Suzuki et al.

[11] 3,877,809

[45] Apr. 15, 1975

[54] DEVICE FOR INDICATING THE SIZE OF COPY SHEETS AND THE COVERAGE OF COPYING

[75] Inventors: Shigeru Suzuki; Yuichi Kobayashi, both of Yokohama, Japan

[73] Assignee: Ricoh Co., Ltd., Tokyo, Japan

[22] Filed: Feb. 23, 1973

[21] Appl. No.: 335,310

[30] Foreign Application Priority Data

Mar. 9, 1972 Japan.............................. 47-28619

[52] U.S. Cl. ................. 355/133; 271/162; 340/259
[51] Int. Cl. ........................................... G03b 27/00
[58] Field of Search ............ 355/133; 271/162, 163, 271/164, 171, 145; 340/259

[56] References Cited
UNITED STATES PATENTS

| | | |
|---|---|---|
| 3,104,872 | 9/1963 | Benson et al. ................. 271/171 X |
| 3,408,064 | 10/1968 | Johnson et al. ...................... 271/162 |
| 3,499,645 | 3/1970 | Noda et al. .......................... 271/162 |
| 3,592,464 | 7/1971 | Kanda............................. 271/171 X |

*Primary Examiner*—Fred L. Braun
*Attorney, Agent, or Firm*—Cooper, Dunham, Clark, Griffin & Moran

[57] ABSTRACT

A device comprising a plurality of indication lamps each for indicating a specific size of copy sheets stored in a cassette used with a copying apparatus adapted to selectively use one of the copy sheet cassettes of different sizes. When a cassette of any size is mounted on the copy sheet feed tray in the copying apparatus, one of the indicating lamps corresponding to the size of the copy sheets in the particular cassette is automatically turned on. This permits the size of copy sheets stored in the cassette mounted in the copying apparatus and the coverage of copying thereof to be ascertained from outside.

4 Claims, 6 Drawing Figures

DEVICE FOR INDICATING THE SIZE OF COPY SHEETS AND THE COVERAGE OF COPYING

BACKGROUND OF THE INVENTION

This invention relates to a copy sheet size and copying coverage indication device adapted for use with copying apparatus, which use copy sheet cassettes differing in sizes from one cassette to another depending on the sizes of copy sheets stored therein, to indicate the size of the copy sheets stored in the cassette mounted in the copying apparatus and the coverage of copying thereof.

In one known method of supplying copy sheets to the exposing station of a copying apparatus, a roll of a web of paper or other material provided in the copying apparatus is unwound and automatically cut into a sheet or sheets of a size corresponding to a particular original to be copied each time copying is carried out. In another known method, a number of copy sheets of a predetermined size are placed on a copy sheet supply tray and supplied one by one to the exposing station by means of an automatic copy sheet feed device.

The latter method is suitable for high speed copying because, though the method does not enable to supply copy sheets of a size suitable for a particular original to be copied without requiring manual attention, the method eliminates the need to unwind and cut the roll and permits copy sheet feed to be carried out quickly.

However, some disadvantages are associated with this method. If copy sheets are placed on the copy sheet feed tray at random or if they are supplied to the copy sheet feed tray from the copy sheet holder without any consideration being paid to the original to be copied, difficulty will be experienced when all the copy sheets on the copy sheet feed tray have been exhausted or the copy sheets on the copy sheet feed tray are going to be replaced by copy sheets of another size. Besides, it is not desirable that the photosensitive material surface of the copy sheets should be brought into direct touch with the hands of the operator. To obviate these disadvantages, proposals have been made to provide a number of copy sheet cassettes each storing therein copy sheets of a predetermined size and to selectively use a cassette of any size as desired by mounting it in a copying apparatus.

The use of such copy sheet cassettes offers many advantages because the need to adjust the position of the copy sheets on the copy sheet feed tray is eliminated, the copy sheets on the copy sheet feed tray can be supplemented readily, and the old copy sheets can be replaced readily and positively by new copy sheets of different sizes.

However, the use of copy sheet cassettes has one disadvantage. It is necessary to use copy sheets of a size which is the same as or slightly larger than the original to be copied to produce perfect duplicates of the original. It is not possible to ascertain the size of the copy sheets from outside if the copy sheets are stored in a cassette mounted in the copying machine.

SUMMARY OF THE INVENTION

An object of this invention is to provide a device for indicating the size of copy sheets and the coverage of copying adapted for use with a copying apparatus of the type which selectively uses a copy sheet cassette storing a number of copy sheets therein, so that the size of the copy sheets stored in the particular copy sheet cassette mounted in the copying apparatus can be ascertained by the operator from outside.

Another object of the invention is to provide a device of the type described above which permits the coverage of copying of the copy sheets stored in the copy sheet cassette mounted in the copying apparatus.

According to the invention, there is provided a device for indicating the size of copy sheets and the coverage of copying comprising a plurality of switches adapted to be selectively opened and closed by a copy sheet cassette mounted in the copying apparatus, and a plurality of indicating lamps each controlled by one of the switches.

The device according to the invention is adapted for use with copying apparatus which selectively use a copy sheet cassette storing therein a number of copy sheets of a predetermined size and which are provided with a copy sheet feed tray permitting copy sheet feed cassettes of different sizes to be readily mounted therein and removed therefrom. When a copy sheet cassette of any size as desired is mounted on the copy sheet feed tray in the copying apparatus which is set at a predetermined operation position, one of the indicating lamps corresponding to the size of the particular cassette mounted in the copying apparatus is turned on. This permits the size of the copy sheets mounted in the copying apparatus and the coverage of copying thereof to be readily ascertained from outside.

DESCRIPTION OF A PREFERRED EMBODIMENT

Figure 1:
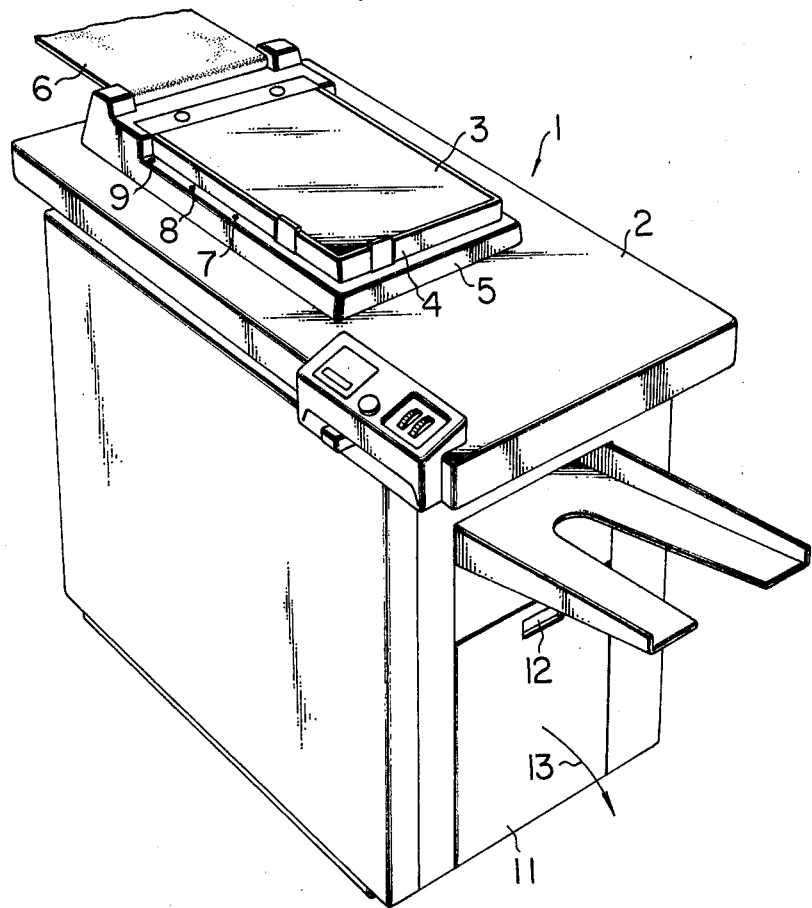
FIG. 1 is an external view of a copying apparatus in which the invention is incorporated.

FIG. 1 is an external view of the copying apparatus 1 incorporating the invention therein. The copying apparatus 1 comprises a transparent original rest plate 3 disposed on an upper surface 2 for placing an original (not shown) to be copied. Support plates 4 each supporting one of the four edges of plate 3 are secured to a frame 5 which in turn is secured to the upper surface of the copying apparatus. A pressing plate 6 for holding down the original on plate 3 is pivotally connected at its base to one end of frame 5, and indicating lamps 7, 8 and 9 are disposed on the upper surface of one side of frame 5 each for indicating the respective size of copy sheets stored in the copy sheet cassette mounted in the copying apparatus. The lamps are turned on by the process subsequently to be described.

A cover 11 adapted to be opened and closed when a copy sheet cassette is mounted or removed is provided in the lower portion of one end of the copying apparatus. Cover 11 is provided with a handle 12 which is pulled in the direction of arrows 13 to open cover 11.

Figure 2:
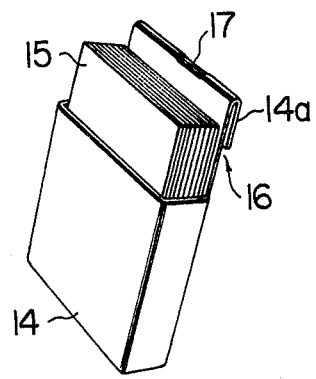
FIG. 2 is a perspective view of a copy sheet cassette used in the invention.

FIG. 2 shows a copy sheet cassette 14 adapted to be mounted in the copying apparatus and storing therein copy sheets 15 of a predetermined size. When cassette 14 is mounted in the copying apparatus, copy sheets 15 are exposed at one end portion by tearing off one end portion of cassette 14 such that one end plate 14a is left connected to the body of cassette 14. The end plate 14a left connected to the body of cassette 14 is bent outwardly to provide a hook 16 for holding the cassette in place in the copying apparatus. A perforation 17 is provided in the central portion of the bend of end plate 14a to provide a reference opening for positioning the cassette in the copying apparatus.

Figure 3:
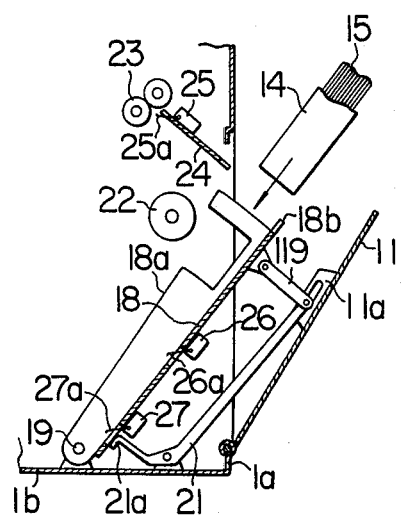
FIG. 3 is a sectional front view of an indicating device comprising one embodiment of the invention.

FIG. 3 shows cover 11 in its open position for mounting cassette 14 on a copy sheet feed tray 18 in the copying apparatus. Cover 11 is pivotally connected at its base to a side plate 1a of the copying apparatus. Copy sheet feed tray 18 has two side walls 18a (only one being shown) which are pivotally connected at their bases through a shaft 19 to a bottom plate 1b of the copying apparatus.

A link arm 119 is mounted between the upper portion of an underside of copy sheet feed tray 18 and a slot formed in a projection 11a from cover 11. A link arm 21 is hingedly connected at the free end of its major portion to the end of the link arm 119 connected to the slot and pivotally connected at its base to the bottom plate 1b of the copying apparatus, with a bent portion 21a formed at the free end of its minor portion being pressed by the underside of copy sheet feed tray 18.

A copy sheet feed roller 22 is disposed above copy sheet feed tray 18 while a pair of delivery rollers 23 are disposed above copy sheet feed roller 22. A guide plate 24 and a first switch 25 are disposed between copy sheet feed roller 22 and delivery rollers 23. Second and third switches 26 and 27 are mounted in the middle portion and the lower end portion, respectively, of the underside of copy sheet feed tray 18. Actuators 26a and 27a of switches 26 and 27 respectively extend upwardly through openings formed in tray 18 so that their heads are disposed above the upper surface of tray 18.

In mounting copy sheet cassette 14 in the copying apparatus, the cassette is inserted obliquely downwardly, as shown in FIG. 3, with the exposed end of copy sheets 15 facing upwardly, into the apparatus so that it will be placed on tray 18. Copy sheet feed tray 18 is formed in the middle portion of its upper end edge with a projection 18b of a relatively small width which is adapted to be aligned with the perforation 17 formed at the bend of the cassette 14. In mounting cassette 14, projection 18b rips perforation 17 open and extends through the broken perforation 17 so as to regulate the position of cassette 14 on copy sheet feed tray 18 with respect to the width thereof.

After cassette 14 is correctly positioned on copy sheet feed tray 18, cover 11 is closed. This causes copy sheet feed tray 18 to move counter clockwise from its position shown in FIG. 3 to its position shown in FIG. 4, so that the surface of the uppermost copy sheet in the exposed upper portion of cassette 14 is brought into engagement with the periphery of copy sheet feed roller 22. Copy sheets 15 in cassette 14 are exposed by breaking a portion of three walls near end plate 14a (See FIG. 2), so that the exposed end of copy sheets 15 is at a predetermined distance from hook 16. This distance is constant regardless of the sizes of cassettes.

Figure 4:
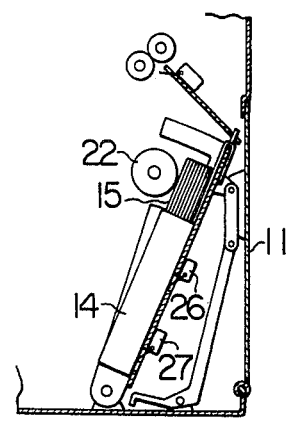
FIG. 4 and FIG. 5 are views in explanation of the operation of the device shown in FIG. 3.

It will thus be seen that, when a cassette is mounted on the copy sheet feed tray, the position of the copy sheets in the cassette with respect to the width of the tray is regulated by the projection 18b of copy sheet feed tray 18 and the position with respect to the length thereof is regulated by the upper end of tray 18 engaging hook 16. The arrangement in which the upper end of the copy sheet feed tray is used as a reference for positioning the copy sheets in the cassette with respect to the length of the tray is effective particularly to bring copy sheet feed roller 22 into engagement with the surface of the uppermost copy sheet in the exposed upper portion of the cassette as shown in FIG. 4 irrespective of the sizes of copy sheets.

Figure 5:
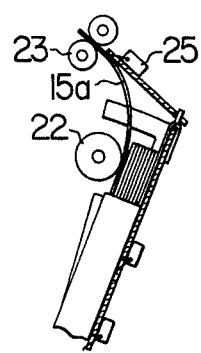

As soon as cassette 14 is mounted on copy sheet feed tray 18 and copy sheet feed roller 22 is brought into engagement with the uppermost copy sheet, the uppermost copy sheet 15a is automatically moved a predetermined distance as shown in FIG. 5 and stops in a position in which the leading end portion thereof is held between delivery rollers 23. The description of the feed mechanism will be omitted because it does not form a part of the invention.

Copy sheet cassettes of different sizes may be mounted on copy sheet feed tray 18. When a cassette of the smallest size (first type cassette) adapted for use with the copying apparatus is mounted on copy sheet feed tray 18, the lower end portion of the cassette fall short of the actuator 26a of switch 26. That is, when the first type cassette is set at a predetermined position (See FIG. 4) after being mounted on copy sheet feed tray 18, first switch 25 is actuated as shown in FIG. 5 by the uppermost copy sheet 15a which is automatically moved a predetermined distance as aforementioned.

Figure 6:
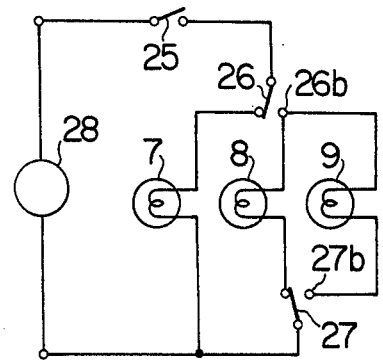
FIG. 6 is diagram of an electric circuit used with the device according to the invention.

When switch 25 is closed in FIG. 6, a power source 28 is connected to first indicating lamp 7 to turn on the same, thereby indicating that the first type cassette is mounted in the copying apparatus. If a second type cassette larger by one size than first type cassettes is mounted on copy sheet feed tray 18, then the actuator 26a of second switch 26 is pushed by the underside of the cassette to actuate the switch. Third switch 27 is disposed in a position in which the lower end of the second type cassette does not reach the actuator 27a thereof.

When second switch 26 is actuated in FIG. 6, a movable contact thereof is brought into engagement with a normally open fixed contact 26b. Second indicating lamp 8 is turned on when first switch 25 is actuated by the uppermost copy sheet 15a, thereby indicating that the second type cassette is mounted in the copying apparatus.

If a third type cassette larger by one size than second type cassettes or the largest cassette mounted in the copying apparatus is mounted on copy sheet feed tray 18, then the actuators 26a and 27a of second and third switches 26 and 27 respectively are pushed by the underside of the cassette as shown in FIG. 4 so that the two switches are actuated. Actuation of switches 26 and 27 in FIG. 6 brings a movable contact 26a of switch 26 and a movable contact 27a of switch 27 into engagement with a normally open contact 26b and normally open contact 27b respectively. When first switch 25 is actuated by the uppermost copy sheet 15a (See FIG. 5), third indicating lamp 9 is turned on, thereby indicating that the third type cassette is mounted in the copying apparatus.

Indication of the type of cassette mounted in the copying apparatus is given by the indicating lamps 7, 8 and 9 disposed on the frame 5 shown in FIG. 1.

It is to be understood that the number of sizes of the copy sheet cassette used in the present invention is not limited to three and that cassettes of other sizes may be used in the invention.

What is claimed is:

1. A copying machine, comprising feed tray means for releasably receiving a copy sheet cassette containing a plurality of copy sheets, the size of said plurality of copy sheets being one of a plurality of selected different sizes; a transparent plate for supporting an original for copying; a plurality of indicator lamps arranged along one edge of said plate and visible from outside the machine, each lamp being spaced a predetermined distance from one end of said plate perpendicular to said edge, said predetermined distance corresponding to the maximum extremity of the coverage of copying and corresponding to copy sheets of a selected one of said plurality of different sizes contained in said cassette received by said tray means; switch means for detecting the size of the last recited sheets; and electrical circuit means for turning on one of said plurality of indicator lamps in response to the detection of size by said switch means.

2. A copying machine according to claim 1 further comprising means adapted to feed a copy sheet from a cassette received by said feed tray means to a predetermined intermediate position in contact with said switch means, said switch means being actuated by the sheet in said intermediate position to energize said circuit means to turn on one of said indicator lamps.

3. Apparatus for indicating the presence of and length of copy sheets in a copying machine, comprising:
   a. feed tray means pivotably supported at its lower end for movement between a cassette mounting position and a copy sheet feed position;
   b. a copy sheet cassette of fixed length closed on all sides and open at one end only for containing a plurality of copy sheets, the length of the cassette being one of a plurality of selected different cassette lengths, the length of the copy sheets contained therein corresponding to the cassette length and the copy sheets extending outwardly at their leading edge from said open end of the cassette, said feed tray means releasably receiving the cassette when in its cassette mounting position;
   c. a guide plate positioned adjacent said open end of a cassette when said feed tray means is in its copy sheet feed position;
   d. means positioned adjacent said guide plate and adjacent said open end of the cassette when said feed tray means is in its copy sheet feed position for feeding the copy sheets from the cassette onto said guide plate;
   e. first switch means mounted adjacent said guide plate and adapted to be actuated by a copy sheet after it is fed by said feeding means from the cassette onto said guide plate;
   f. first signal means associated with said first switch means by an electrical circuit and responsive to the actuation of said first switch means by a copy sheet to indicate the presence of at least one copy sheet and thereby to indicate the presence of a cassette of the shortest of the selected lengths upon said feed tray means;
   g. second switch means mounted adjacent said feed tray means in a position such that it is adapted to be actuated by a cassette of a selected length longer than the shortest of the selected lengths as the cassette is positioned upon said feed tray means and not to be actuated by a cassette of the shortest of the selected lengths; and
   h. second signal means associated with said second switch means by an electrical circuit and responsive to the actuation of said second switch means to indicate the presence of a cassette of a length longer than the shortest of the selected lengths, whereby said first and second signal means differentiate between cassettes and copy sheets contained therein of two different selected lengths available to be used for copying.

4. Apparatus according to claim 3 further comprising:
   i. third switch means mounted adjacent said feed tray means and spaced longitudinally of said feed tray means a defined distance from said second switch means, said third switch means being positioned such that it is adapted to be actuated by a cassette of a selected length longer than the shortest of the selected lengths and longer than the second-mentioned length as the cassette is positioned on said feed tray means and not to be actuated by a cassette of the shortest or the second-mentioned of the selected lengths; and
   j. third signal means associated with said third switch means by an electrical circuit and responsive to the actuation of said third switch means to indicate the presence of a cassette of a length longer than the shortest or the second-mentioned of the selected lengths whereby said first, second and third signal means differentiate between cassettes and copy sheets contained therein of three different selected lengths available to be used for copying.

* * * * *